United States Patent [19]

Ladin

[11] Patent Number: 4,815,867
[45] Date of Patent: Mar. 28, 1989

[54] SIDE ASSEMBLED CLIP FOR SELF-ALIGNING BEARING

[75] Inventor: Eli M. Ladin, Ann Arbor, Mich.

[73] Assignee: Federal-Mogul Corporation, Southfield, Mich.

[21] Appl. No.: 100,046

[22] Filed: Sep. 23, 1987

[51] Int. Cl.⁴ .................. F16C 19/00; F16C 23/08; F16D 23/14

[52] U.S. Cl. .................................. 384/617; 192/98; 192/110 B; 384/612

[58] Field of Search ............... 384/495, 539, 537, 590, 384/592, 609, 612, 617, 607; 192/98, 110 B

[56] References Cited

U.S. PATENT DOCUMENTS

| 3,788,437 | 1/1974 | Camp | 192/98 |
| 3,921,775 | 11/1975 | Matyschik | 384/612 X |
| 4,029,186 | 6/1977 | De Gennes | 192/98 |
| 4,080,019 | 3/1978 | Flaissier | 192/98 X |
| 4,357,058 | 11/1982 | Sonnerat | 384/612 X |
| 4,437,556 | 3/1984 | Brandenstein et al. | 192/110 B X |
| 4,506,774 | 3/1985 | Block | 192/98 |
| 4,519,488 | 5/1985 | Renaud | 384/617 X |
| 4,529,075 | 7/1985 | Renaud | 192/98 |
| 4,555,190 | 11/1985 | Lederman | 384/495 |
| 4,566,578 | 1/1986 | Leigh-Monstevens et al. | 384/617 X |
| 4,608,741 | 9/1986 | Mallet | 384/617 X |
| 4,684,005 | 8/1987 | Mittendorf | 192/98 |

FOREIGN PATENT DOCUMENTS 2255505 7/1975 France ................. 384/607

Primary Examiner—Stuart S. Levy
Assistant Examiner—Thomas R. Hannon
Attorney, Agent, or Firm—Lawrence J. Shurupoff; Robert F. Hess

[57] ABSTRACT

A clutch release bearing assembly includes a tubular plastic carrier member for actuating a self-aligning clutch release bearing. The bearing is connected to the carrier with a rigid annular clip. The rigid clip is formed with recesses or tabs which receive or engage complimentary mating portions provided on the carrier. A radial flange is formed on the clip for axially restraining the bearing on the carrier. Bearing seals may be provided on the flange to prevent debris from entering the bearing assembly.

9 Claims, 4 Drawing Sheets

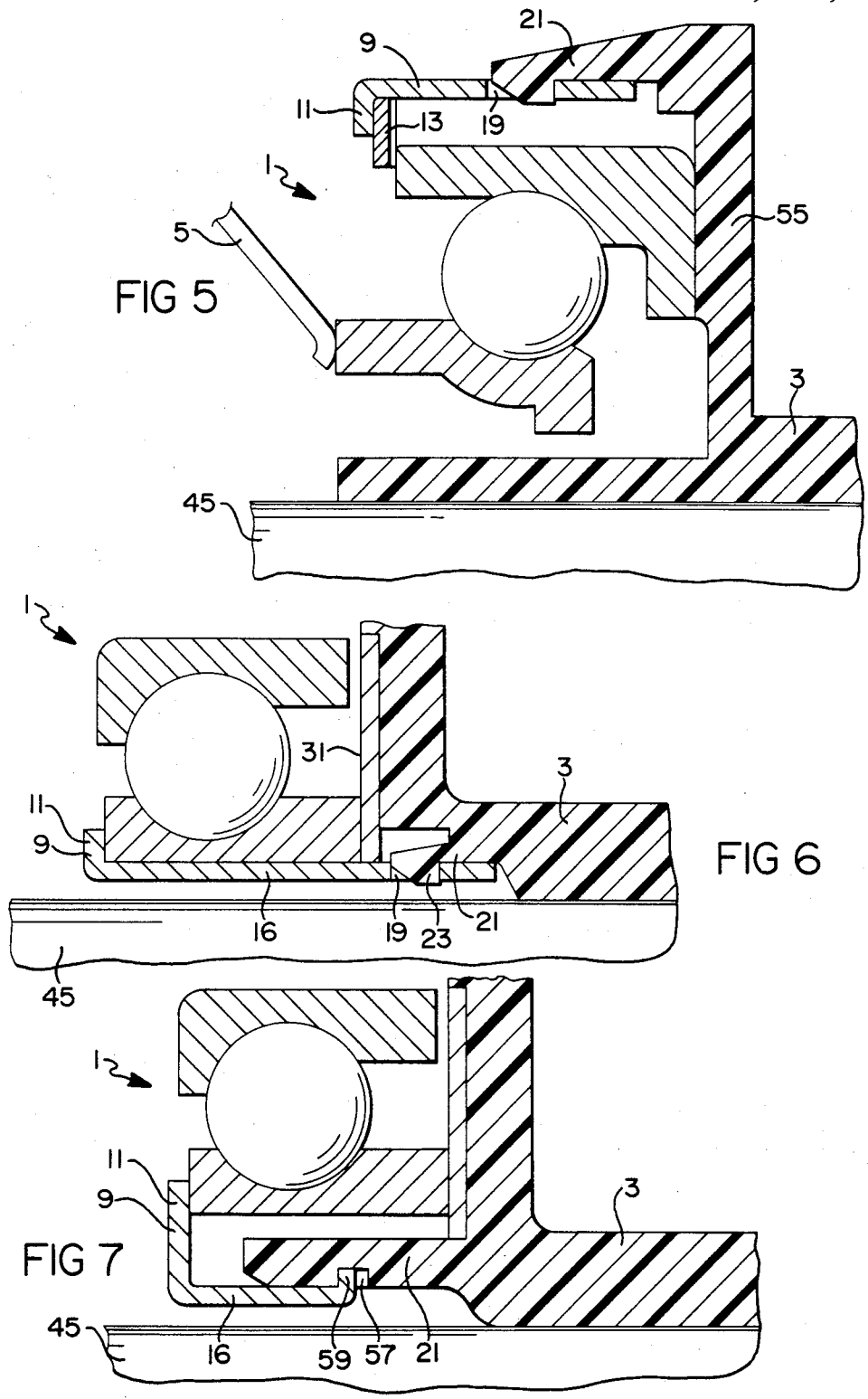

SIDE ASSEMBLED CLIP FOR SELF-ALIGNING BEARING

BACKGROUND OF THE INVENTION

1. Field of the Invention

This invention relates generally to self-aligning bearings and particularly concerns a retaining clip for accurately mounting a ball or roller bearing upon a plastic carrier of a clutch release bearing assembly.

2. Description of Prior Developments

Self-aligning clutch release bearings are generally mounted upon a carrier or sleeve which slides over a shaft or quill during engagement and disengagement of an operatively associated clutch member. One approach to mounting the bearing to the carrier has involved deforming or rolling over an axial end portion of a cylindrical metal carrier member to form an annular radial flange which serves to axially restrain the bearings on the carrier. This approach has presented several drawbacks.

First, the rolling of deformation of the carrier generally limits the selection of carrier materials to metals. Recent developments have suggested the desirability using plastic materials for forming the carrier, including increased dimensional accuracy, reduced weight and reduced cost.

Second, the rolling of the end of the carrier to form a retaining flange is difficult to accurately control and has been associated with serious operational problems during bearing use. For example, bearing preload is often controlled by the axial pressure generated by a preload element such as a belleville, cone or annular wave spring which is compressed between the radially deformed carrier flange and an axial end surface of a bearing race. Since the bearing preload is quite sensitive to the degree of axial compression of the preload element, minor deviations in the axial location of the carrier flange due to uncontrollable axial tolerances produced during formation of the flange produce large variations in bearing preload thereby leading to unsatisfactory bearing performance.

Still another problem associated with the formation of a bearing retaining flange by rolling or swaging a radial flange on a metal bearing carrier is the axial and radial dislocation of the preload spring from its intended operational position between the flange and bearing. As the flange is formed, it may cause the preload spring to shift to distort in such a manner that uniform contact between the bearing and washer is lost. This causes an uneven circumferential loading on the bearing which further adversely affects bearing performance.

Yet another drawback to a rolled or swaged flange is the difficulty experienced in checking the finished bearing assembly during quality control operations. Once the flange is formed by a rolling operation there is no known method to quickly and easily check the finished part for bearing preload accuracy. That is, the amount of deformation of the carrier flange during rolling varies considerably in practice and is not easily measured.

Finally, the rolling or swaging process is relatively time consuming and generally cumbersome since all parts must be held together for a considerable period of time while the flange is slowly deformed. If the rolling operation is carried out too quickly, the metal being deformed will tear thereby resulting in a defective part which must be scrapped.

Accordingly, a need exists for an improved mounting assembly for accurately locating a bearing and preload element both axially and radially on a plastic carrier so as to closely control bearing preload, improve bearing performance and facilitate assembly and quality control operations.

SUMMARY OF THE INVENTION

The present invention has been developed to fulfill the needs identified above and therefore has as a primary object the provision of a mounting clip for accurately locating a bearing, preferably a self-aligning bearing, upon a bearing carrier of a clutch release mechanism.

Another object is to provide an improved bearing mounting clip having sealing members for retaining lubricant within the bearing as well as between the bearing carrier and the shaft or quill upon which the carrier reciprocates.

Still another object is to expedite assembly of a bearing to a carrier member of a clutch release mechanism and to facilitate quality control review of the completed apparatus.

Yet another object is to provide a rigid bearing mounting clip which radially supports and strengthens a plastic bearing carrier.

The realization of these objects and various other objects, features and attendant advantages of the present invention will be more fully appreciated from the following detailed description when considered in connection with the accompanying drawings, in which the same reference numbers designate the same or corresponding parts throughout.

BRIEF DESCRIPTION OF THE DRAWINGS

In brief, the drawings include:

FIG. 5 is a fragmental sectional axial elevation view through yet another embodiment of the clip for engaging the outer race of a bearing;

FIG. 6 is a fragmental sectional elevation view through a bearing and clip showing the clip attached directly to a bearing race;

FIG. 7 is a fragmental sectional elevation view through a bearing and clip wherein an engagement flange or engagement hooks are provided on the clip and mating engagement recesses are formed in the carrier;

DETAILED DESCRIPTION OF THE PREFERRED EMBODIMENT

The invention will now be described in conjunction with the drawings, beginning with FIG. 1 which shows a bearing assembly 1 mounted on a carrier member 3. A preferred application of the bearing assembly and carrier is the actuation of a clutch release mechanism associated with an automobile power train. While a self-aligning bearing assembly is shown, any type of bearing having rolling elements retained between bearing races may be used.

Figure 1:
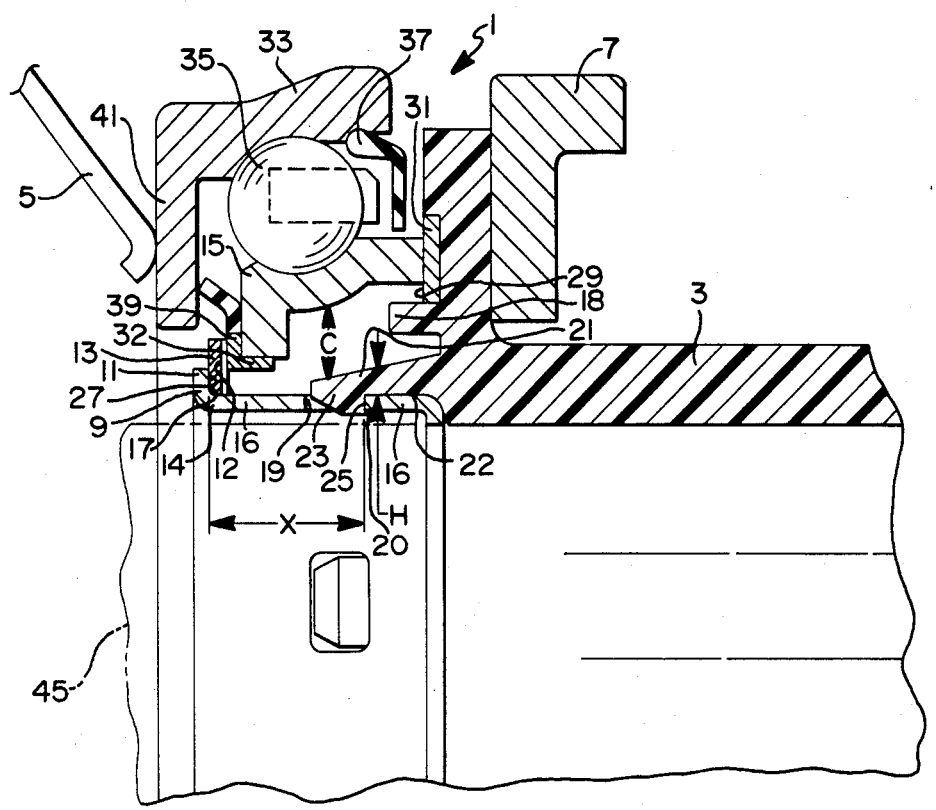
FIG. 1 which is a fragmental axial or side elevation view, partly in section, of a self-aligning bearing assembly mounted to a carrier with a bearing retainer clip.

As further seen in FIG. 1, clutch spring fingers 5 are arranged to contact the bearing assembly 1 while clutch fork 7 is arranged to actuate the carrier 3 in a known fashion. The bearing assembly is connected to the carrier with a rigid clip or bearing retainer 9 so that axial movement of the carrier actuates or axially moves the bearing assembly over a support shaft 45.

Figure 2:
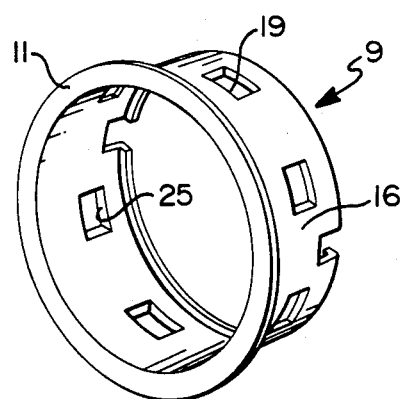
FIG. 2 is a perspective view of the bearing retainer clip of FIG. 1.
Figure 10:
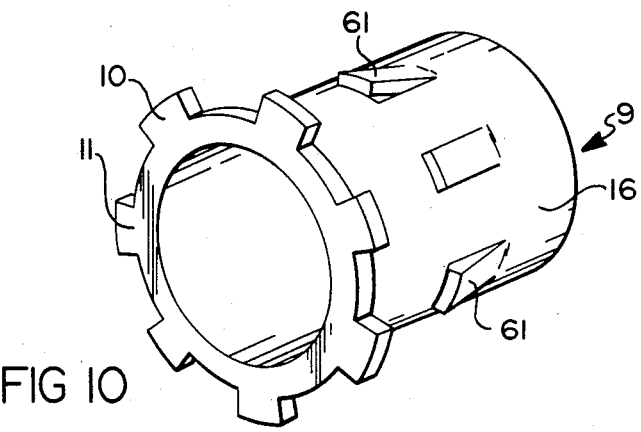
FIG. 10 is a perspective view of the clip of FIG. 9.

Clip 9, as better seen in FIG. 2, is generally cylindrical or tubular in shape with a radially outwardly extending flange 11 formed at one axial end portion. Flange 11 is formed for axially engaging and compressing a bearing preload or biasing element such as a wave washer or belleville washer 13, as seen in FIG. 1, The flange 11 may be formed as a continuous rim or formed as arcuate circumferentially spaced segments or tabs 10 as shown in FIG. 10.

The degree of the axial compression of washer 13 determines the bearing preload applied to the inner ring or race 15 of the bearing assembly 1. As indicated above, it is critical to control not only the axial compression of the washer 13 but also to control its alignment and position against the bearing race.

To achieve this dimensional accuracy and position control, clip 9 is preferably formed of a rigid metal material such as C-1010 steel and flange 11 is formed to resist any degree of axial deformation which could significantly affect bearing preload while compressing and retaining washer 13 against race 15. The axial stiffness of flange 11 is achieved by forming the clip with a material thickness of about 0.015 inch and by limiting the radial height of the flange to minimize bending moments about the base 14 of the flange.

To further control the position and compression of washer 13, the axially extending tubular or cylindrical portion 16 of the clip is formed to resist any significant radial compression through use of the materials identified above so that the radial location of the radial innermost surface 12 of the washer 13 is accurately and positively determined. Since bearing assembly 1 is preferably of the self-aligning variety and is shown as such, the bearing assembly is provided with a degree of freedom to shift or move along a radial plane (vertically as seen in FIG. 1). In order to prevent excessive radial bearing movement which could overstress or damage clip 9 via forced contact with race 15, an axially projecting annular stop member 18 limits the radial movement of race 15 to a predetermined extent so that race 15 is prevented from directly radially contacting clip 9.

By mounting the retainer 9 to the carrier 3 in the manner shown in FIG. 1, an operational advantage is achieved which is not immediately apparent. More particularly, by forming an axial and radial annular recess 20 within an inner surface portion of the carrier, a portion 22 of the clip 9 may be interposed between quill 45 (shown in phantom) and the carrier at a position radially inwardly of the bearing assembly.

This axial and radial nesting of the clip within an axial end portion of the carrier provides significant radial support to that portion of the carrier which abuts the clip, as best seen in FIG. 1. This clip-abutting portion of the carrier is disposed adjacent to and radially inwardly of the bearing assembly. Since the clip is formed of a strong stress-resistant material, the need for additional radial strength or support from the carrier is obviated. This is particularly desirable when the carrier is formed of a plastic material.

Since the clip provides substantially all the required strength and rigidity to radially support the bearing assembly, the radial height of the carrier material adjacent the clip may be minimized. Thus, the height H of the carrier which lies beneath or radially inwardly of the bearing assembly can be minimized since its radial support is not required. This arrangement provides greater radial clearance C between the bearing assembly and the carrier.

In self-aligning bearing assemblies such as that shown in FIG. 1, the bearing assembly 1 is free to shift radially with respect to the carrier and quill, as noted above. By maximizing the clearance C between the bearing and carrier, greater design flexibility is afforded since a more radially compact bearing assembly can be designed which provides the necessary radial clearance C for self alignment purposes.

Without the radial support of the clip, the radial height H of the carrier would have to be increased to provide adequate carrier material thickness to support the bearing assembly. This in turn would decrease clearance C and would require the use of a larger bearing. That is, the inner diameter of the bearing would have to be increased to provide sufficient radial clearance C and this in turn would necessitate an increased outer bearing diameter and larger mounting space requirements for the bearing assembly.

To further increase clearance C, Clip 9 may extend over the entire axial extent of the bearing assembly 1 so that no portion of the carrier, particularly cantelevered portion 21, need extend axially beneath the bearing assembly.

Accurate positioning of the preload element 13 may be further improved by forming flange 11 at a sharp radial break from the outer tubular surface of the clip to provide a sharp 90° angle at 17. The inner radius of curvature at 17 should preferably be limited to a maximum of 0.005 inch to prevent axial and radial sliding movement of the inner surface 12 of the preload washer over the curved portion of the 90° bend. Prior rolling techniques created a large bend radius which allowed axial and radial sliding movement of the preload washer over the arcuate bend surface thereby leading to the problems noted above.

In order to positively and accurately secure the clip to the carrier, at least one engagement recess or window 19 is formed in the clip to receive at least one resilient hook member 21 provided on the carrier. While a single window and hook may be used, a plurality of evenly or symmetrically circumferentially spaced hooks and windows is preferred. The plastic hooks are preferably axially cantelevered from the carrier and terminate in a radial projection 23. While any form of radial abutment or latching surface on clip 9 will suffice for engaging the radial projection 23, a recess is preferred to minmiize the radial extent of the main tubular portion of the clip. That is, a radially outwardly projecting ridge on clip 9 would function well, but the increased outer diameter of the ridge could adversely reduce clearance C noted above.

During assembly of the clip to the carrier, the hooks 21 radially deflect against the rigid clip and snap into position within the recesses 19. As seen in FIG. 1, the distance X from the inner face 25 of each recess 19 to the inner face 27 of flange 11 is accurately controlled during manufacture of the clip to provide the close tolerance necessary for accurate preload control. Tolerances on the order of 0.002 inch should be maintained on dimension X to achieve optimum bearing performance.

Since the carrier 3 is preferably molded of a plastic material, tight manufacturing tolerances on the carrier can be accurately and economically achieved by standard plastic molding techniques. This accuracy is necessary to maintain accurate axial spacing between the outer face 29 of wear plate 31 and the inner face 25 of recess 19 to further ensure desired bearing preload levels. That is, the axial location of race 15 is determined by surface 29 and the axial location of clip 9 is determined by surface 25. The preload element is loaded or wedged between these two elements, and the spacing therebetween determines preload levels.

Tolerances on the thickness of plate 31 can be easily controlled and for practical purposes are negligible. In addition, the axial tolerance of the radially extending portion or width of annular metal base 32 of seal 39 is likewise closely controlled so that tolerances between preload element 13 and base 32 can also be considered negligible.

The bearing assembly 1 in FIG. 1 is shown with an outer race or ring 33, inner race 15, and rolling element 35 located therebetween. Rear seal 37 and front or nose seal 39 are provided on the races to seal in lubricant and seal out dirt and debris. A radially extending thrust face 41 is formed on the outer race to engage clutch fingers 5. In order to simplify and economize this somewhat conventional structure, a modified arrangement for nose seal 39 is shown in FIG. 3.

Figure 3:
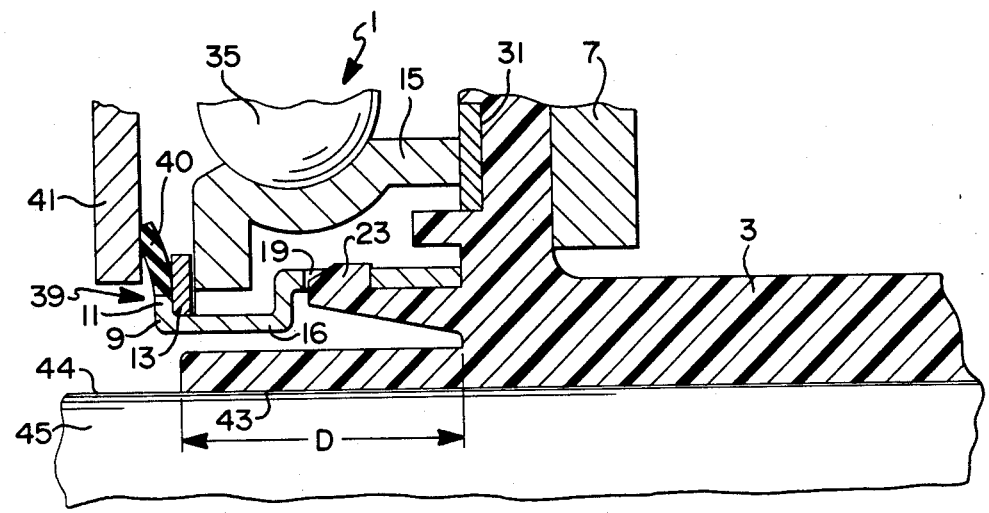
FIG. 3 is a fragmental sectional axial elevation view through an alternate embodiment of the clip provided with a bearing seal.

By molding elastomeric material 40 directly to the outer end portion of flange 11 as seen in FIG. 3, annular nose seal 39 may be integrated with the clip. This is in contrast to molding the elastomeric material to a separate seal base 32 as in FIG. 1. Elimination of separate seal element 39 also removes an additional, although minor, source of tolerance.

While hook 23 is shown in FIG. 1 as pointing radially inwardly, it may alternately be arranged as shown in FIG. 3. The hook 23 in FIG. 3 is modified in design to point radially outwardly. This modification, by eliminating a separate seal element 39, provides a more axially compact bearing and carrier assembly for use in those applications where axial working clearance is limited.

Moreover, the carrier arrangement shown in FIG. 3 provides greater available axial bearing surface support between the inner tubular surface 43 of the carrier and the outer surface 44 of quill 45 than that shown in FIG. 1. That is, an additional tubular bearing support surface extends over length D to provide greater radial support to the bearing assembly.

Figure 4:
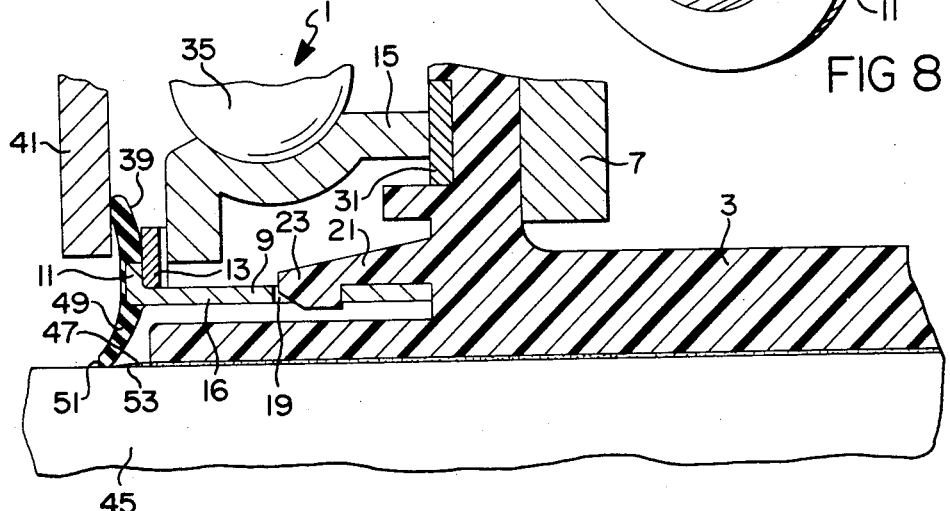
FIG. 4 is a fragmental sectional axial elevation view through another embodiment of the clip provided with a bearing seal and a wiper seal.

As shown in FIG. 4, in order to provide smooth movement of the carrier 3 over quill 45, a lubricant 47 such as grease or the like is conventionally applied therebetween. After extensive use this lubricant can be lost, or worse, can become contaminated with debris such as friction material abraded from the clutch. This debris then acts as an abrasive which causes rapid wear of both the carrier and quill, leading eventually to failure of the clutch release mechanism through binding of the carrier upon the quill.

To prevent such lubricant contamination and system failure, an additional wiper seal or lip 49 may be formed on the clip as seen in FIG. 4. As the carrier reciprocates over the quill, annular lip 49 wipes or plows contaminants from the quill surfaces with outer lip face 51 while retaining lubricant within an annular space between the carrier and quill with inner lip face 53.

Another embodiment of the invention is shown in 5 wherein the bearing assembly 1 is clipped to radial flange 55 of the carrier 3. In this arrangement, the axially extending hook 21 projects from the radial outer portion of carrier flange 55.

Still another embodiment is shown in FIG. 6 wherein the bearing assembly 1 is not of the self aligning type. Since radial shifting of the bearing does not take place, the bearing assembly 1 may be mounted directly on the clip 9 as shown. Complete radial support for the bearing is thus provided by the clip.

Figure 8:
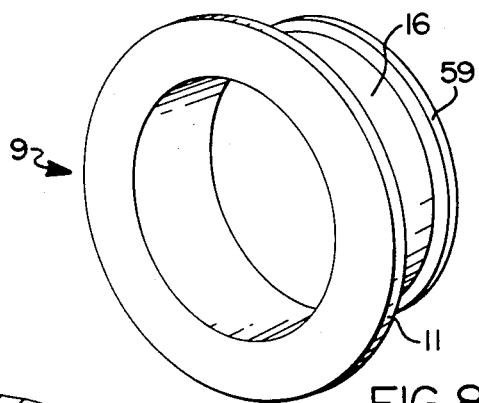
FIG. 8 is a perspective view of the clip of FIG. 7.

Instead of forming the recesses or windows 19 within the clip 9 as best seen in FIG. 2, the arrangement shown in FIG. 7 may have the clip-engaging recesses 57 formed within the carrier 3 and a mating engagement flange 59 provided on the clip. The modified clip for this system is shown fully in FIG. 8.

In those cases where the loads applied to the carrier and bearing assembly are extreme, it has been found advantageous to use the clip and recess configurations shown in FIGS. 9–12. In each of these embodiments, the resiliency of the engagement and locking or mating force between the carrier and clip is provided by resilient fingers or tabs 61. As the plastic hook 21 shown in FIGS. 1 and 3 through 7 may suffer from fatigue under high cyclical loading, the metallic tabs will better resist such fatigue as they positively anchor themselves within recesses or windows 62 formed in the carrier.

Figure 9:
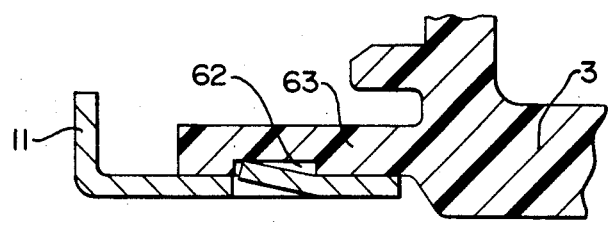
FIG. 9 is a sectional view of an alternate clip configuration wherein outwardly projecting hook members are provided on the clip and mating recesses are formed within the carrier.

While the axially extending or cantilevered hooks 21 shown in FIGS. 1 and 4–7 are designed to flex or deflect radially outwardly upon engagement with clip 9, the cantilevered portion 63 of carrier 3 shown in FIG. 9 is preferably formed to resist deflection during such engagement and to resist fatigue. The resiliency of engagement is provided by the tabs 61. Alternatively, the tabs 61 may be punched or plastically deformed into the recesses after placement of the clip on the carrier.

Figure 11:
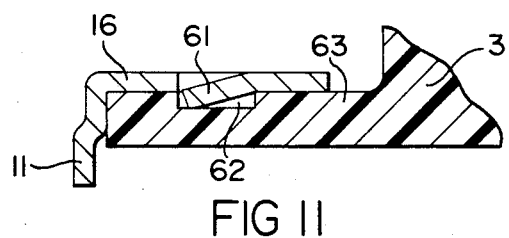
FIG. 11 is a fragmental sectional view of an alternate embodiment of the clip having inwardly projecting engagement hooks.
Figure 12:
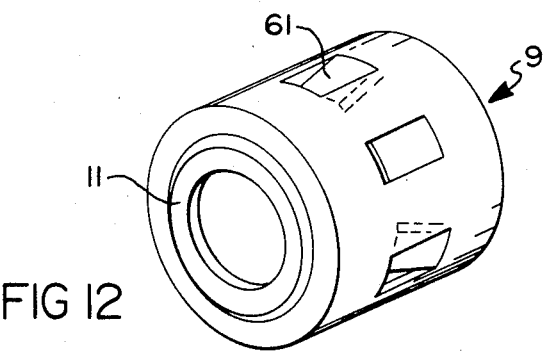
FIG. 12 is a perspective view of the clip of FIG. 11.

The radially inwardly flexing hook 21 shown in FIG. 3 may be replaced with a relatively stiff cantelevered carrier portion 63 and formed with a recess 62 as shown in FIG. 11 such that the fingers 61 which may be formed on clip 9 of FIG. 3 deflect during engagement rather than the carrier. Similarly, the clip and carrier engagement arrangement show in FIGS. 9 and 10 may be directly applied to the bearing and carrier assemblies of Figures 1 and 4–7, just as the engagement arrangement shown in FIGS. 11 and 12 may be directly applied to the embodiment of FIG. 3.

Moreover, it can be readily appreciated that any of the clip and window or recess arrangements shown in any of the Figures may be used with any of the embodiments disclosed. All that is required is to match a window formed in one member with a hook or finger formed in the other. Any resilient member may be made rigid as long as its mating member (hook, finger or recess) is made resilient.

Obviously, numerous modifications and variations of the present invention are possible in light of the above teachings. It is therefore to be understood that within the scope of the appended claims, the invention may be practiced otherwise than as specifically described herein. For example, resilient hooks may be formed on the clip 9 to replace the rigid flange 59 and the windows or recesses 19 may be formed in the carrier such as shown in FIG. 7. The hooks or tabs 61 in FIG. 10 could alternatively point radially inwardly as shown in FIG. 11 and engage a recess formed in the carrier in a similar manner as that shown in FIG. 11.

What is claimed is:

1. A rigid cylindrical bearing and carrier assembly, comprising:
   bearing means (1);
   a bearing carrier (3) for actuating said bearing means (1); said bearing carrier having a radially outwardly extending thrust flange intermediate the axial ends of said carrier;
   clip means (9) having an axially extending tubular portion (16) disposed radially of said bearing means (1) for connecting said bearing means (1) to said carrier (3);
   said clip means (9) comprising first engagement means (19,59,61) for engaging said carrier (3) and locking said clip means and bearing means to said carrier and second engagement means (11) for axially restraining said bearing means, said second engagement means (11) comprising a radially projecting rigid member highly resistant to axial deflection encapsulating said bearing means between said rigid member and said thrust flange, said radially projecting rigid member providing means to preload said bearing means against said thrust flange, and
   at least a portion of said axially extending tubular portion (16) of said clip means being axially and radially nested on an axial end portion of said carrier and in intimate contact therewith to thereby provide radial strength and rigidity to that portion of said carrier.

2. The assembly of claim 1 wherein said carrier means (3) comprises a plastic material and wherein said clip means (9) comprises a metallic material.

3. The assembly of claim 1 wherein said carrier means (3) comprises resilient means (21) for cooperating with said first engagement means (19,59).

4. The assembly of claim 3 wherein said resilient means (21) comprises hook means (23) and wherein said first engagement means comprises at least one recess (19) formed in said clip means for receiving said hook means (23).

5. The assembly of claim 1, wherein said clip means (9) comprises resilient means (61) for engaging said carrier.

6. The assembly of claim 1 wherein said second engagement means (11) comprises an annular flange (11).

7. The assembly of claim 6 further comprising seal means (39) provided on said second engagement means.

8. The assembly of claim 7 wherein said seal means (39) comprises means (40) for sealing said bearing means (1).

9. The assembly of claim 7 wherein said seal means (39) comprises means (49) for sealing lubricant within said bearing carrier (3).

* * * * *